(12) United States Patent
Roy et al.

(10) Patent No.: US 10,009,726 B2
(45) Date of Patent: Jun. 26, 2018

(54) BATTERY EFFICIENT HYBRID MOBILE DEVICE LOCATION MONITORING

(71) Applicant: Ping4, Inc., Nashua, NH (US)

(72) Inventors: Sean Nathan Roy, Stratham, NH (US); Kurt Alfred Dobbins, New Castle, NH (US); Mark Thomas Sexton, Merrimack, NH (US); Sett Paing Oo, Nashua, NH (US); Rindress Andrew MacDonald, Hollis, NH (US); Tatsuki Nakano, Nashua, NH (US); Daniel Willis Post, Tewksbury, MA (US); Mohamed Jamal Fadlalla, Manchester, NH (US)

(73) Assignee: PING4 INC., Nashua, NH (US)

( * ) Notice: Subject to any disclaimer, the term of this patent is extended or adjusted under 35 U.S.C. 154(b) by 0 days. days.

(21) Appl. No.: 15/256,080

(22) Filed: Sep. 2, 2016

(65) Prior Publication Data
US 2017/0034660 A1 Feb. 2, 2017

Related U.S. Application Data

(63) Continuation-in-part of application No. 14/616,400, filed on Feb. 6, 2015, now Pat. No. 9,491,582.
(Continued)

(51) Int. Cl.
*H04W 4/02* (2018.01)
*H04W 4/021* (2018.01)
(Continued)

(52) U.S. Cl.
CPC ......... *H04W 4/023* (2013.01); *H04W 4/021* (2013.01); *H04W 4/027* (2013.01); *H04W 12/02* (2013.01); *H04W 52/0251* (2013.01); *H04W 88/02* (2013.01); *Y02D 70/00* (2018.01); *Y02D 70/1262* (2018.01); *Y02D 70/142* (2018.01); *Y02D 70/164* (2018.01)

(58) Field of Classification Search
CPC . H04W 4/023; H04W 52/0251; H04W 4/027; H04W 4/021; H04W 12/02; H04W 88/02; Y02B 60/50
See application file for complete search history.

(56) References Cited

U.S. PATENT DOCUMENTS

| 6,832,093 B1 * | 12/2004 | Ranta ................... H04W 48/04 455/422.1 |
| 8,199,001 B2 * | 6/2012 | Verbil ................... G01C 21/26 340/539.13 |

(Continued)

*Primary Examiner* — Nathan Mitchell
(74) *Attorney, Agent, or Firm* — Arent Fox LLP

(57) ABSTRACT

A method, apparatus, and computer program product for performing hybrid location monitoring of a mobile device. While performing region monitoring for a set of regions, a mobile device enters a first region. Upon entering a region, the mobile device requests region information for the region from a web server. Using the region information, the mobile device determines whether to enable location updates while within the region. Upon exiting the region, the mobile device determines whether to disable location updates. While performing location updates, the location of the mobile device can be tracked and be determined to be within other contained or partially contained irregularly shaped geofences.

28 Claims, 10 Drawing Sheets

Timeline of region enter and exit events for Region Monitoring.

Related U.S. Application Data

(60) Provisional application No. 62/214,686, filed on Sep. 4, 2015.

(51) Int. Cl.
  *H04W 12/02* (2009.01)
  *H04W 52/02* (2009.01)
  *H04W 88/02* (2009.01)

(56) References Cited

U.S. PATENT DOCUMENTS

| | | |
|---|---|---|
| 2005/0096065 A1 | 5/2005 | Fleischman |
| 2006/0293066 A1* | 12/2006 | Edge .............. H04W 4/02 455/456.3 |
| 2007/0281716 A1 | 12/2007 | Altman et al. |
| 2008/0274752 A1* | 11/2008 | Houri .............. G01S 5/0252 455/456.1 |
| 2009/0153401 A1 | 6/2009 | Eitan et al. |
| 2010/0026570 A1* | 2/2010 | Amidi ............. G01S 5/0027 342/357.43 |
| 2010/0199098 A1 | 8/2010 | King |
| 2010/0246467 A1* | 9/2010 | Song ............... H04W 60/04 370/312 |
| 2012/0157113 A1* | 6/2012 | Brisebois .......... G01S 5/00 455/456.1 |
| 2012/0258734 A1 | 10/2012 | Takahashi et al. |
| 2013/0012234 A1 | 1/2013 | Tufty et al. |
| 2013/0040600 A1 | 2/2013 | Reitnour et al. |
| 2013/0184010 A1 | 7/2013 | Lagnado et al. |
| 2013/0225207 A1* | 8/2013 | Sennett ............ H04W 4/02 455/456.3 |
| 2013/0244686 A1 | 9/2013 | Saha et al. |
| 2013/0336287 A1 | 12/2013 | Abraham et al. |
| 2014/0128057 A1 | 5/2014 | Siomina et al. |
| 2014/0171013 A1* | 6/2014 | Varoglu ............ H04W 4/22 455/404.2 |
| 2014/0274136 A1 | 9/2014 | Edge et al. |
| 2015/0189473 A1* | 7/2015 | Makris ............ H04W 4/025 455/456.3 |
| 2016/0088564 A1 | 3/2016 | Ahmadzadeh et al. |
| 2016/0105765 A1 | 4/2016 | Farley et al. |

\* cited by examiner

Timeline of region enter and exit events for Region Monitoring.

Logical representation of enter and exit
events for Region Monitoring

Timeline of region enter and exit events for Region Monitoring and precise Location Updates Logical representation of enter and exit events occur for Region Monitoring and precise Location Updates

BATTERY EFFICIENT HYBRID MOBILE DEVICE LOCATION MONITORING

CROSS-REFERENCE TO RELATED APPLICATION

This application is a continuation-in-part of U.S. application Ser. No. 14/616,400 titled "METHOD FOR OPTIMIZING MOBILE DEVICE BATTERY USE WHILE TRACKING THE LOCATION OF AN ANONYMOUS MOBILE DEVICE" and filed on Feb. 6, 2015, and claims the benefit of U.S. Provisional Application Ser. No. 62/214,686, entitled "BATTERY EFFICIENT HYBRID MOBILE DEVICE LOCATION MONITORING" and filed on Sep. 4, 2015, the entire contents of each of which are expressly incorporated by reference herein in its entirety.

BACKGROUND

Field

Aspects of the present disclosure relate generally to monitoring a circular region at a mobile device including using entrance of the mobile device into that region as criteria to enable location tracking for the mobile device while it is within the region. Exiting the region may be used to cause the mobile device to disable location tracking for the mobile device and only perform region monitoring. While performing location tracking within the circular region, the location of the mobile device can be used to monitor the location of the device with respect to a contained or partially contained irregularly shaped geofence. Enter and Exit events can be generated for this irregularly shaped geofence using the location updates from the mobile device.

Description of the Related Art

The cellular phone market is transitioning from 'feature' phones to 'smart' mobile devices. Feature phones primarily allow phone calls and text messages. Smart mobile devices (phones, tables, etc.) allow the functionality of a laptop computer in a smaller mobile device. Smart mobile devices can connect to the Internet either over the cell phone network or by using Wi-Fi connectivity. Smart mobile devices can run small software applications known as apps. Smart mobile devices can be aware of the device location through the use of a Global Positioning System (GPS) chip, cell phone tower triangulation, or a Wi-Fi network location mapping.

Certain applications track the location of the smart mobile device through the use of some or all of the methodologies available to the device. Navigation software applications are an example of one class of applications that track the location of the mobile device with high precision in order to be able to provide detailed turn-by-turn navigation instructions. However, navigation applications also consume a corresponding large amount of the available battery power.

Smart mobile devices can receive emails, containing rich media information, but the email is not specific to the location where the mobile device is located.

As part of the Location Services provided by the mobile operating system on the smart mobile device, the devices are able to identify and track the position of the device relative to predefined circular regions. This process is known as Region Monitoring. An example region may be a geographic area defined by a circular area of a specified radius defined around a geographic point (e.g., latitude, longitude), such as a point of interest to the user. The Location Service on the mobile device may be programmed with Regions to monitor. After establishing regions to monitor, the mobile operating system (OS) will notify a corresponding location based mobile application on the mobile device when the mobile device has entered or exited a region that the application has designated for the mobile OS to monitor.

It may be helpful at times to track the location of a mobile device more accurately than is possible with region monitoring. However, this type of location tracking requires a larger amount of battery power. A strategy to preserve mobile device battery would be to enable location tracking within a pre-defined area or region, and disable location tracking when the mobile device is not within the region.

SUMMARY

Aspects presented herein provide the benefits of location tracking while minimizing the power used to provide this service. Aspects presented herein provide the ability to track the location of a mobile device more accurately while the phone is within a particular region, or nearby, but not track the location of the mobile device when the mobile device is outside a particular region, or not nearby. This more precise location tracking may be used to allow more precise location based messaging to occur without having to incur the battery usage required by tracking the location of the mobile device all of the time. This more precise location tracking also enables the use of non-circular, irregularly shaped defined regions, also referred to herein interchangeably as "geofences" to trigger location based messages versus the circular shaped geofences used with Region Monitoring.

In an aspect of the disclosure, a method, system, mobile device, mobile device application, and computer program product are presented that perform hybrid mobile device location monitoring at a mobile device, including receiving notification of entering a first region from a mobile Operating System (OS); requesting region information for the first region from a web server; determining whether to enable location updates based on the region information for the first region; and enabling location updates from the mobile OS when it is determined to enable location updates.

In an aspect of the disclosure, a method, system, web server apparatus, web service, and computer program product are presented that enable hybrid mobile device location monitoring at a mobile device, including receiving entry of a plurality of regions along with region information for each of the regions, wherein region information includes an indication of whether location tracking should be enabled within that region; receiving an indication from a mobile device that the mobile device has entered a first region; and transmitting region information for the first region to the mobile device, including the indication of whether location tracking should be enabled within that region.

Additional advantages and novel features of aspects of the present invention will be set forth in part in the description that follows, and in part will become more apparent to those skilled in the art upon examination of the following or upon learning by practice thereof.

DETAILED DESCRIPTION

Figure 1:
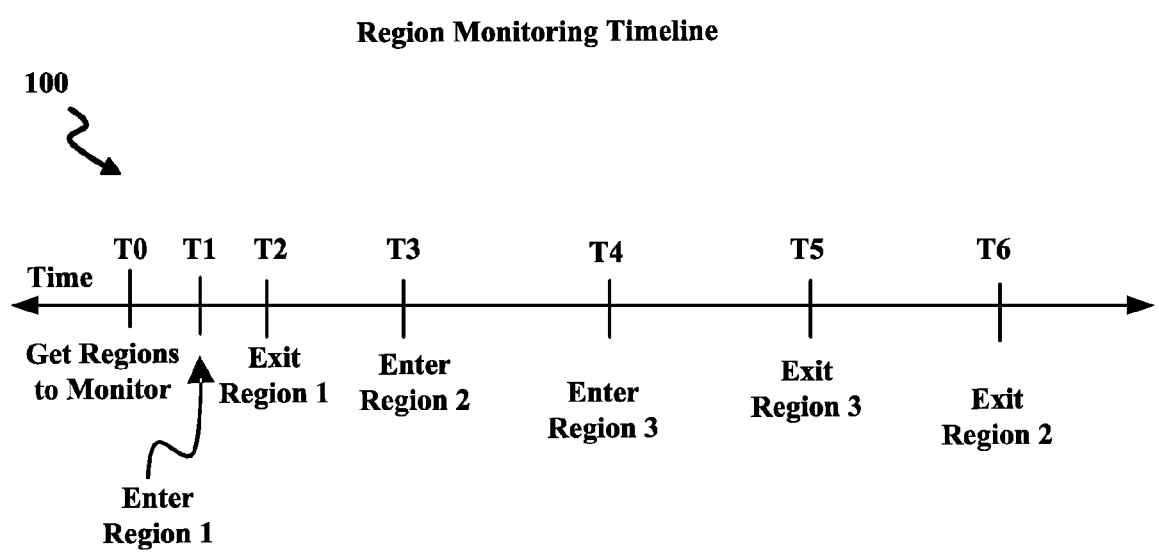
FIG. 1 illustrates a diagram depicting a timeline of region Enter and Exit events for Region Monitoring.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details and that the invention is not limited in its application to the details of construction and the arrangements of components set forth in the following description or illustrated in the drawings. Moreover, the claims hereof are not to be read restrictively unless there is clear and convincing evidence manifesting a certain exclusion, restriction, or disclaimer.

Several aspects of optimizing mobile device region monitoring, location tracking, and region management will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Aspects presented herein relate to U.S. application Ser. No. 14/145,391 titled "SYSTEM AND METHOD FOR ANONYMOUS DELIVERY OF GEOGRAPHICALLY SPECIFIC RICH MEDIA INFORMATION" and filed on Dec. 31, 2015; U.S. application Ser. No. 14/616,400 titled "METHOD FOR OPTIMIZING MOBILE DEVICE BATTERY USE WHILE TRACKING THE LOCATION OF AN ANONYMOUS MOBILE DEVICE" and filed on Feb. 6, 2015; U.S. Provisional Application No. 62/137,046, titled "METHOD FOR OPTIMIZING MOBILE DEVICE REGION MONITORING AND REGION MANAGEMENT FOR AN ANONYMOUS MOBILE DEVICE" filed on Mar. 23, 2015; and U.S. Provisional Application No. 62/171,900, titled "METHOD FOR TAG BASED FILTERING ON GEOGRAPHIC REGIONS, DIGITAL ASSETS, MESSAGES, AND ANONYMOUS USER PROFILES" filed on Jun. 5, 2015, the entire contents of each of which are incorporated herein by reference.

One aspect is that region monitoring and location tracking can be performed such that the identity of the owner of the smart phone is never known to the system. Aspects allow the location tracking and region monitoring, e.g., without requiring username, without requiring the user to enter an email address or phone number, without the system collecting the mobile device's Unique Device Identifier (UDID), etc. Additionally, the mobile device may control the enablement of location services on the mobile device.

The system may provide, e.g., customers who wish to deliver location-based messages to mobile device the ability to login to a web service to define geographic regions. A region may be used to denote a trigger that causes precise location tracking to occur within the region. Smaller, irregularly shaped geofences may be created within this larger circular region. Messages may be associated to the larger circular region or to the smaller contained non-circular regions. Messages may also include digital assets such a photographs, videos, sound files, documents, etc., e.g., as described in connection with U.S. application Ser. No. 62/171,900.

The system may provide an application that can be downloaded by a user of the mobile device and installed onto the device. The application registers the smart mobile device with the web service. The mobile application may then begin to dynamically and adaptively monitor regions nearby the mobile device. The nearby regions may be updated as the mobile device moves, e.g., as described in U.S. application Ser. No. 62/137,046, the entire contents of which are incorporated herein by reference.

When the mobile Operating System (OS) notifies the mobile application that a region has been entered, the mobile application may examine the region information to determine whether more precise location tracking should be enabled for the mobile device based on the configuration of the region. If so configured, the mobile application may initiate precise location tracking of the mobile device. The precise location tracking may continue until the mobile OS notifies the application that the mobile device has exited the circular region. The mobile application will use the Exit event to disable precise location tracking for the device since the device has exited the circular region configured for precise tracking. The precise location tracking may benefit from battery conservation techniques, e.g., such as those described in detail in U.S. application Ser. No. 14/616,400, the entire contents of which are incorporated herein by reference.

While the mobile application is tracking the precise location of the mobile device, the mobile device may enter a smaller, contained geofence within the region. This secondary region may be circular or non-circular in shape. It is optional to have this secondary region. If such a region is configured, using the more precise location information from the mobile device, the web service may detect the entrance of the device into the geofence region. The web service may then notify the mobile application on the mobile device that a smaller, precise geofence has been entered. The mobile application may use this notification retrieve more information from the server for the geofence. This additional information may include rich media and digital assets for the mobile application to display to the mobile device user.

FIG. 1 illustrates a timeline of events that occur when a mobile device is performing Region Monitoring, e.g., on Region 1, Region 2, and Region 3 contained within Region 1.

Figure 2:
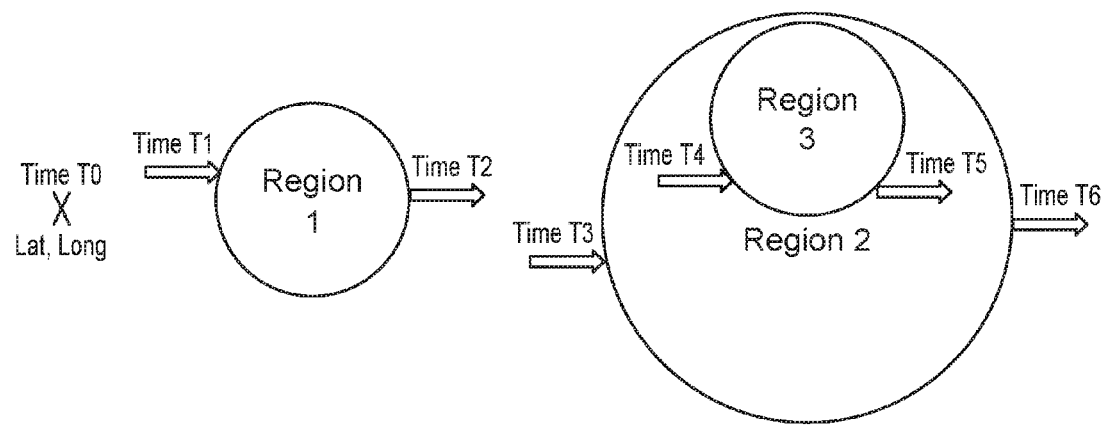
FIG. 2 illustrates a logical representation of where the Enter and Exit events occur for circular regions used for Region Monitoring.

FIG. 2 shows a logical representation of the timeline events in FIG. 1. Each time, Tx (i.e. T0, T1, T2, . . . ) directly relates to the timeline labels in FIG. 1. FIG. 2 shows where these events might occur in relation to the geographic region definitions. As illustrated in FIG. 2, Region 1 and Region 2 may be non-overlapping regions, whereas Region 3 may fall within the area defined for Region 2. This is merely one example. In other examples, Region 1 and Region 2 may be partially overlapping. Similarly, Region 3 may only partially overlap with the area defined for Region in other examples. The aspects presented herein, can be used with any combination of regions.

Initially, at time T0, the mobile device obtains the regions to be monitored. The mobile device may also receive a location, e.g., a latitude and longitude, for the mobile device at that time. For example, the mobile device may identify Region 1, Region 2, and Region 3 for region monitoring. The mobile device may perform region monitoring.

At time T1, the mobile device enters Region 1. At time T2, the mobile device exits Region 1. Thereafter, at time T3, the mobile device enters Region 2. Which inside Region 2, at time T4, the mobile device enters Region 3. At time T5, the mobile device exits Region 3 and remains within Region 2. At time T6, the mobile device exits Region 2.

Figure 3:
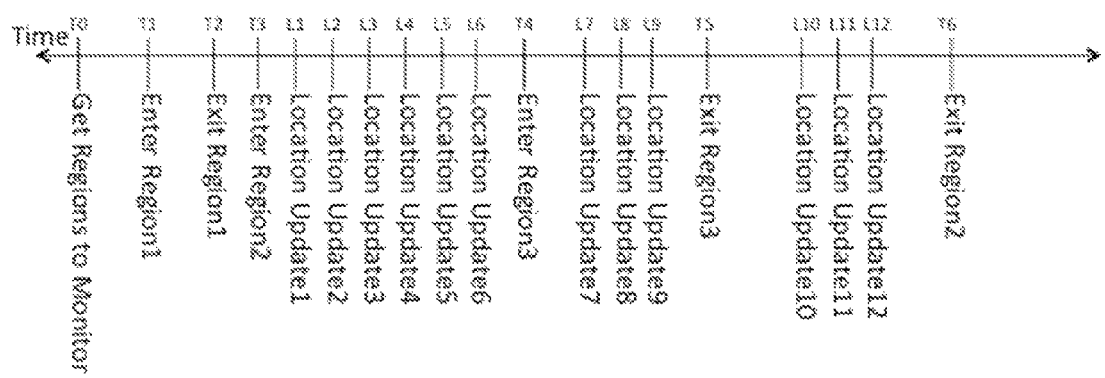
FIG. 3 illustrates a diagram depicting a timeline of region Enter and Exit events for Region Monitoring, which enables the precise Location Updates within properly configured regions and disables precise Location Updates outside of the regions.

FIG. 3 shows an example timeline illustrating the manner in which Location Update events and Region Monitoring events might both occur when a mobile device is performing Region Monitoring on Region 1, Region 2, and Region 3 contained within Region 1. For example, entrance into Region 2 may enable precise Location Updates from the mobile device. These Location updates are labeled Lx (L1, L2, etc) on the timeline and may comprise, e.g., latitude, longitude, and other information about the current location of the mobile device.

Figure 4:
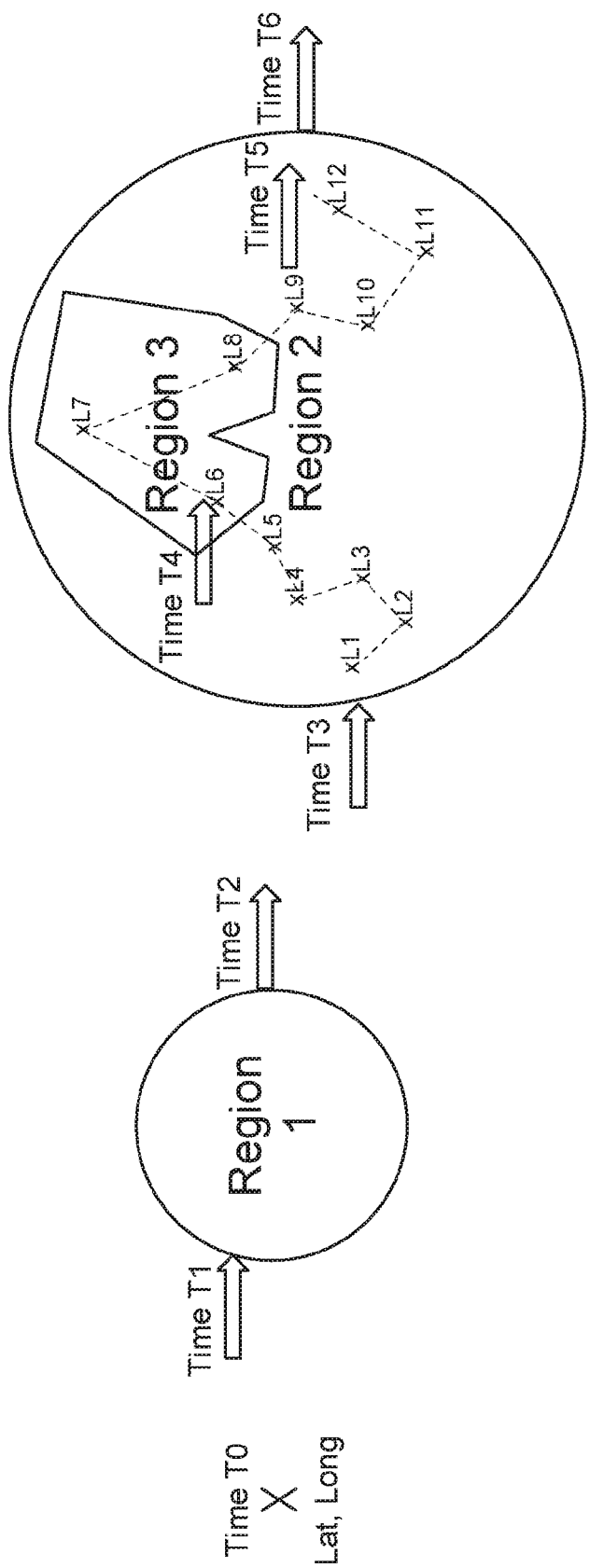
FIG. 4 illustrates a logical representation of where the Enter and Exit events occur for circular regions used for Region Monitoring and where the Location Updates with precise locations occur within the circular regions.

FIG. 4 shows an example logical representation of the timeline events in FIG. 3. Each time, Tx (i.e. T0, T1, T2, . . . ) and Lx (i.e. L1, L2, L3, . . . ) directly relates to the timeline labels in FIG. 3. FIG. 4 shows where these events might occur in relation to the geographic region definitions. As noted in connection with FIG. 2, the placement of Regions 1, 2, and 3 are merely examples. Although illustrated as non-overlapping, Regions 1 and 2 might partially overlap, for example.

Similar to FIGS. 1 and 2, at time T0, the mobile device may obtain regions to monitor. This may include, e.g., Regions 1, 2, and 3. The mobile device may also receive a location of the mobile device, e.g., a latitude and longitude of the mobile device. At T1, the mobile device enters Region 1. At T2, the mobile device exits Region 1. At T3, the mobile device enters Region 2. Entrance into Region 2 may trigger location tracking. Therefore, at times L1, L2, L3, L4, L5, and L6, the mobile device receives a location update for the mobile device. At time T4, the mobile device enters Region 3. As illustrated in FIG. 4, Region 3 may be non-circular. As the mobile device remains within Region 2, the mobile device continues to receive location updates, e.g., at L7, L8, and L9. At time T5, the mobile device exits Region 3. As the mobile device remains within Region 2, the mobile device continues to receive location updates, e.g., at L10, L11, and L12. Entrance and/or exit into Region 3 may cause a message or other item to be presented at the mobile device. At time T6, the mobile device exits Region 2. Exiting Region 2 may trigger the mobile device to discontinue location tracking.

Figure 5:
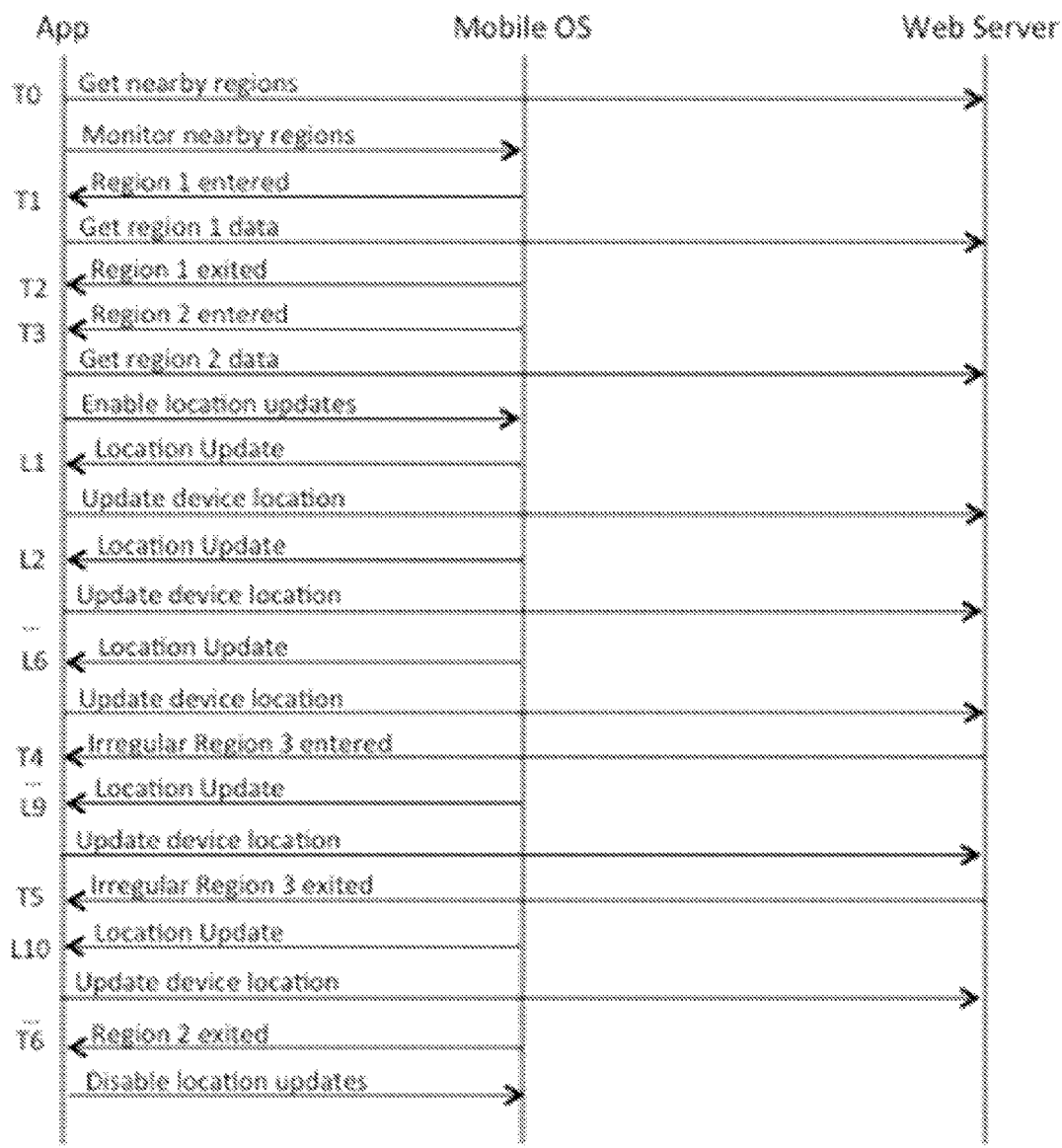
FIG. 5 illustrates a sequence diagram depicting the different system components involved in each event. The time labels on the left hand side of the sequence diagram map to the timeline labels in FIG. 3.

FIG. 5 illustrates an example sequence diagram of shows illustrates communication between the mobile device's OS, the mobile device application installed on the mobile device, and a web server, relating to the timeline events in FIGS. 3 and 4. The labels (T0, L1, etc) map directly from FIG. 5 back to FIG. 3.

For example, at T0, the mobile application communicates with the web server to obtain the regions to be monitored. The regions to be monitored may be updated so that the mobile device continually monitors nearby regions, e.g., as described in U.S. Provisional Application No. 62/137,046, the contents of which are incorporated by reference.

Following receipt of the regions to be monitored, the mobile application communicates with the mobile OS to monitor nearby regions.

At time T1, the mobile OS notifies the mobile application that Region 1 has been entered. Upon receipt of this notification, the mobile application communicates with the mobile server to request data regarding Region 1. This data may include, e.g., the region title, region description, region latitude, region longitude, region radius, region type, or region color. Additionally, the Region 1 data may include an indication that the mobile device should perform location tracking while located within the region. In this example, the data for Region 1 does not indicate that location tracking should occur. At time T2, the mobile OS notifies the mobile application that Region 1 has been exited.

At time T3, the mobile OS notifies the mobile application than Region 2 has been entered. This causes the mobile application to request information regarding Region 2 from the web server. The information received from the web server indicates that location tracking should occur within Region 2. Upon receipt of this information, the mobile application enables location updates at the mobile OS. At times L1, L2, L3, L4 and L5, the mobile OS provides location updates to the mobile application. Each location update may include a current latitude and longitude of the mobile device. Upon receiving each of the location updates, the mobile application communicates with the web server to send an updated location of the mobile device.

At L6, the mobile device sends the web server a location update that falls within Region 3. Thus, at T4, the web server notifies the mobile device that Region 3 has been entered. As illustrated, Region 3 may have an irregular shaped, although aspects presented herein also work for regularly shaped regions. The mobile device continues to receive update locations, e.g., at L7 and L8 and to provide this location to the web server.

At L9, the mobile device application receives a location update from the mobile OS and sends it to the web server that shows the mobile device has exited Region 3. Thus, the web server notifies the mobile device application that Region 3 has been exited. As the mobile device remains within Region 2, the mobile device continues to receive location updates, e.g., at L10, L11, and L12. At time T6, the mobile OS indicates that the mobile device has exited Region 2. This causes the mobile application to disable location updates from the mobile OS.

Figure 6:
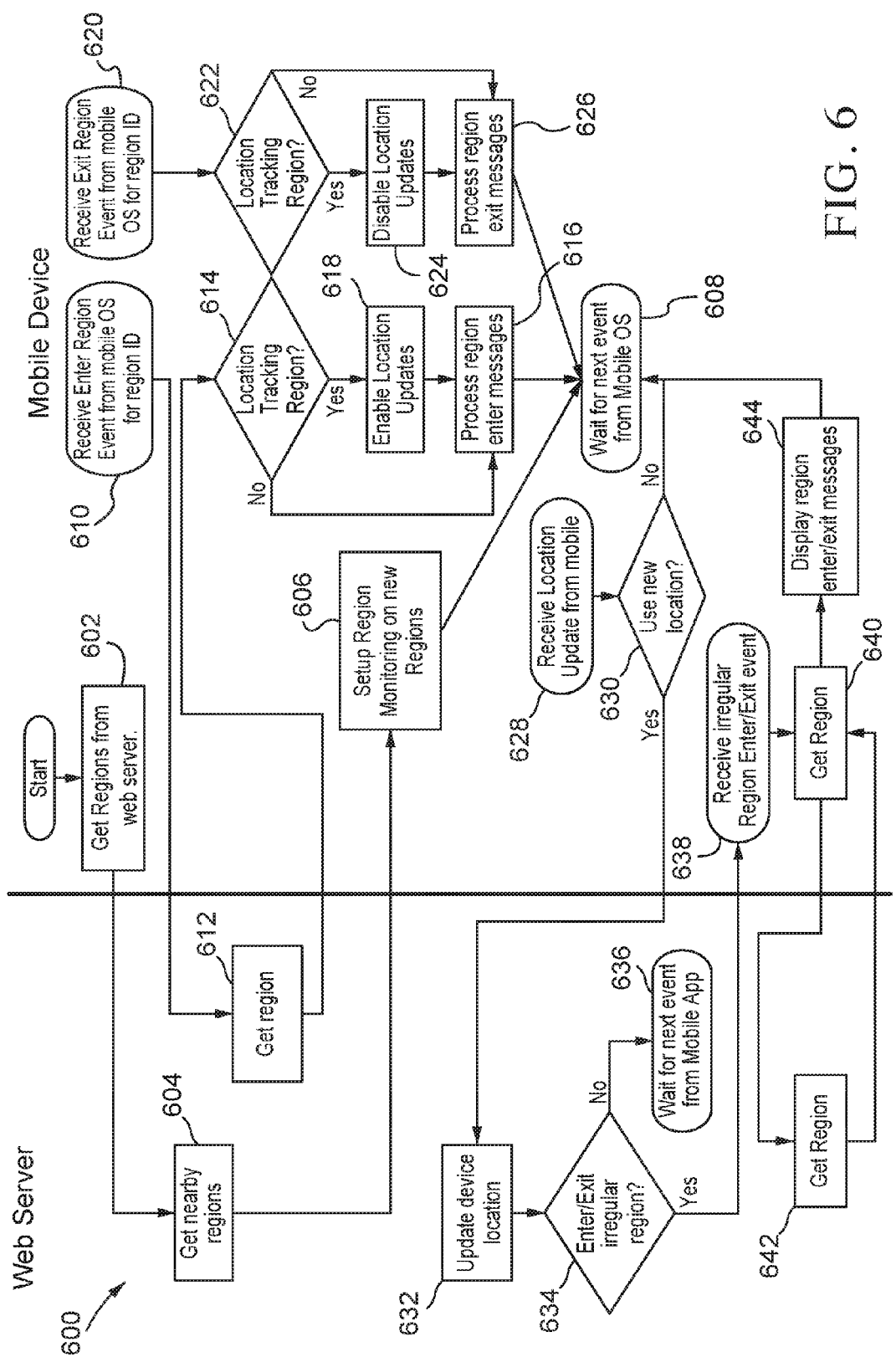
FIG. 6 illustrates a flowchart of the process showing the processing and decision points within the mobile device and the web server in accordance with aspects of the present disclosure.

FIG. 6 shows an example flowchart of the processing and decision points between the mobile application and the web server. Aspects of the method may be performed by an application operating on a mobile device such as mobile device 10 in FIG. 7 or 800 in FIG. 8. Similarly, aspects may be performed by a web server such as 50 in FIG. 7.

At 600, the mobile begins the process. This may include, e.g., obtaining a current location of the mobile, such as a latitude and longitude of the mobile device, from the mobile OS. At 602, the mobile device requests regions to be monitored from the region monitoring web server. At 604, the web server determines and returns to the mobile device regions to be monitored. For example, the mobile device may transmit the location of the mobile device to the web server, and the web server may use that location to determine regions nearby the mobile device for region monitoring purposes.

At 606, the mobile application set up region monitoring for the indicated regions. For example, the mobile application communicates with the mobile OS to perform region monitoring for the regions identified by the web server. Then, at 608, the mobile application waits for an event from the mobile OS.

Block 610 illustrates an example event. At 610, the mobile application receives a notification from the mobile OS that the mobile device has entered one of the monitored regions. Upon receiving this notification, the mobile application requests information regarding the region from the web server at 612. Once the mobile device application receives the information for the region from the web server, the mobile device may determine whether or not location tracking is indicated for the region at 614. If location tracking should not be performed within the region, the mobile device application may also consider other information regarding the region, e.g., the mobile device application may process and present to the user region enter messages, etc., as illustrate at 616. The mobile device application may then return to waiting for an event notification from the mobile OS.

In contrast, if the region information indicates that location tracking should occur within the region, the mobile device application enables location tracking at the mobile OS at 618.

Block 620 illustrates a second example event. At 620, the mobile application receives a notification from the mobile OS that the mobile device has exited one of the monitored regions. As one of the determinations that may be made upon exiting a region, the mobile device application may determine at 622, whether the region was one for which location tracking was enabled. If not, the mobile device may proceed at 626 to process and present to the user region exit messages. If the region was a location tracking region, the mobile device application may also disable location updates at 624, as the device is no longer within the region. Thereafter, the device returns to waiting for an event from the mobile OS.

When location tracking has been enabled, e.g., upon entrance into a particular region, the mobile device application continually receives location updates from the mobile OS, e.g., as illustrated at L1-L12 in FIGS. 3-5. The receipt of a location update is also considered an event from the mobile OS. At 630, the mobile device determines whether or not to use the updated location. For example, this determination at 630 may be used to minimize battery use as described in application Ser. No. 14/145,391, the contents of which are incorporated by reference. If the location. If the mobile device application determines not to use the new location, the mobile device application returns to waiting for the next event from the mobile OS.

If the mobile device application determines that the new location should be used, it informs the web server of the new location. Then, as 632, the web server updates the mobile device application's location.

Using the updated location, the web server determines whether or not the mobile device has entered or exited a defined region, e.g., a geofence. While this region may be circular or other regular shape, it may also be irregularly shaped. If the mobile device has not entered or exited the geofence, the web server waits for the next event, e.g., location update, from the mobile device application. If the mobile device has entered or exited the geofence, the web server notifies the mobile device application at 638. In addition to such notification, the web server may send messages or other items to the mobile device application that may be processed based on the updated location with the geofence.

The notification from the web server based on location tracking may be similar to when the mobile device application receives notification from the mobile OS that it has entered or exited a region using region monitoring on the mobile OS. Based on this notification from the web server, the mobile application requests information regarding the region from the web server at 640. The web server transmits the region information to the mobile device application at 642. Then, at 644, the mobile device application processes enter or exit messages for the geofence region.

Thus, in a hybrid mode, the region monitoring capability of the mobile device may be used to enable and disable location tracking of the smart phone. The system in question would allow the creation of a region that would be denoted to be a region that requires precise device location tracking while devices are within the region. On the mobile device, the mobile application instructs the mobile OS to monitor for nearby regions. When a region is entered, the mobile OS sends the application a region Enter event and the mobile application retrieves information for the region from the web server. The mobile application determines that this is a region requiring location tracking. The mobile application enables location tracking for the device. The mobile application sends periodic location updates to the web server while the mobile device is within the region. When the mobile device exits the region, the mobile OS sends the mobile application a region Exit event and the mobile application disables device location tracking.

Mobile device region monitoring provided by the mobile operating systems allows the mobile devices to monitor circular regions. By enabling a hybrid location mode, the system being described is able to monitor irregularly shaped geofences within the region. When a location update from the mobile device is sent to the web server, the web server checks the location to determine if the location is within a smaller geofence contained within the region. This smaller geofence may be of any shape or size as long as it is contained within the circular region or partially contained within the circular region. Once the location of the device has moved within the smaller, irregular geofence, and a location update has been sent to the web server with this new location, the web server detects the new location of the mobile device to be within the irregular geofence and notifies the mobile application that the device is within a geofence. The mobile application can then take all of the same actions that it can take when it enters a circular region. For example, a specific set of processing may be performed by the mobile application such as the following: Updating specific statistics associated with the irregular geofences, such as site visits, visit frequency (first time, longest, reaching a threshold, etc.). A message may be displayed. A picture may be displayed. A coupon may be displayed. One such use case for an irregular geofences to be contained within a circular region being monitored is to distinguish and process location differently upon entering and existing each of these locations being monitored. Upon entry to a circular region, the mobile device could receive an offer or coupon to visit a physical entity (e.g. a restaurant) represented by the irregular geofence. In this use case, the region may be a certain geographic part of a city. As the mobile device enters the irregular geofence, the mobile application is able to now differentiate entering and exiting the restaurant, with specific processing and/or content; for example, a redemption coupon upon entry or a real-time rating upon exit.

The mobile device may create a digital asset such as a text message, a picture, or a video and attach the asset to the irregular geofence for future use. Assets attached to the irregular geofence may have permissions assigned to them. Some assets may be visible to only the mobile application that created and posted the asset. Some assets may be visible only the social media contacts of the person who created the asset. Some assets may be visible to the general public.

The mobile device may create a digital asset such as a text message, a picture, or a video and attach the asset to the monitored circular region for future use.

Assets attached to the monitored circular region geofence may have permissions assigned to them. Some assets may be visible to only the mobile application that created and posted the asset. Some assets may be visible only the social media contacts of the person who created the asset. Some assets may be visible to the general public.

Region monitoring may include periodically requesting an updated list of regions to be monitored. The region monitoring may be performed similar to that described in U.S. Provisional Application No. 62/137,046.

For example, in order to effectively manage the mobile device to monitor the closest N regions, the application may establish a defined region or a "personal region" around the device. The mobile device may receive a personal region size from the web server. The personal region may be adaptively sized based on the distance to the regions returned by the web server.

Periodically, the application on the mobile device may also check the current location of the device to verify that the device is still within the personal region. If the device has left the personal region, the application may communicate with the web server to establish a new personal region with new regions within it to monitor. Thus, when the mobile device exits the personal region, it may send an indication to the web server and may request an update of the closest regions to be monitored with a preference for regions that match user tags.

In this fashion, a new personal region may only be established when the mobile device exits the previously established personal region. The personal region remains fixed in place and does not move continuously in lock-step with the mobile device movements. Upon exiting its current personal region, a new one may be established.

Thus the mobile device is tuned to adaptively request regions that are nearby to the mobile device and match the user preference tags, and establish a personal region based on the information that is returned by the web server. As the mobile device moves, the personal region may be adaptively resized based on the number of nearby matching regions, but only when it exits its current personal region, thus conserving battery and eliminating the need to track the specific location and movement of the device. This method efficiently manages the number of regions being monitored by the mobile device as well as the need for the mobile application to retrieve more regions as the device moves beyond its personal region.

The location tracking may also include battery saving aspects as described in more detail in connection with U.S. patent application Ser. No. 14/616,400, e.g., including having regions, messages, and mobile applications may be configured with tags to further enhance the user experience. Using the opaque string pattern matching described in application Ser. No. 62/171,900, the mobile application user and the creator of the region may specify ad-hoc descriptors that can be used to filter out unwanted messages and content, and present the mobile app user with only content that the user is interested in seeing.

As the number of regions that can be tracked by a mobile device Location Service may be limited in order to enhance battery life, there is a need to track regions of interest to a mobile device user in a more efficient manner in order to minimize the use of precious resources while providing a more enjoyable user experience. A mobile device user may better tolerate being notified of nearby businesses and deals when the user has opted in to those notifications and the notifications are directly related to the user's configured preferences. As described herein, the user may at any time add new preferences, or set temporary preferences for the purpose of venue-specific, temporal, or location-based interests.

The aspects presented herein may include not only managing the closest monitored regions to the mobile device user, but also managing the regions of specific user interest that are closest to the mobile device user, including associating tags to the anonymous mobile device record stored in a database on the web server. The mobile application may also offer the application user the ability to associate tags to the digital assets loaded to the web server from the mobile device.

The location information may be transmitted from the mobile device to the web server in an anonymous manner. For example, interaction between the mobile device and the web server may use an anonymous token to identify the mobile device, as described in U.S. Provisional Application No. 62/137,046.

For example, when the user downloads an application on the mobile device, the application may register the smart mobile phone with the web service, e.g., in an anonymous manner. The web service returns a GUID to the mobile device application, which is then used as a token for mobile device application and web service interaction. Each application on the mobile device using the web service may have its own GUID. Thus, no personal information for the user or the mobile device is provided to the web server.

Figure 7:
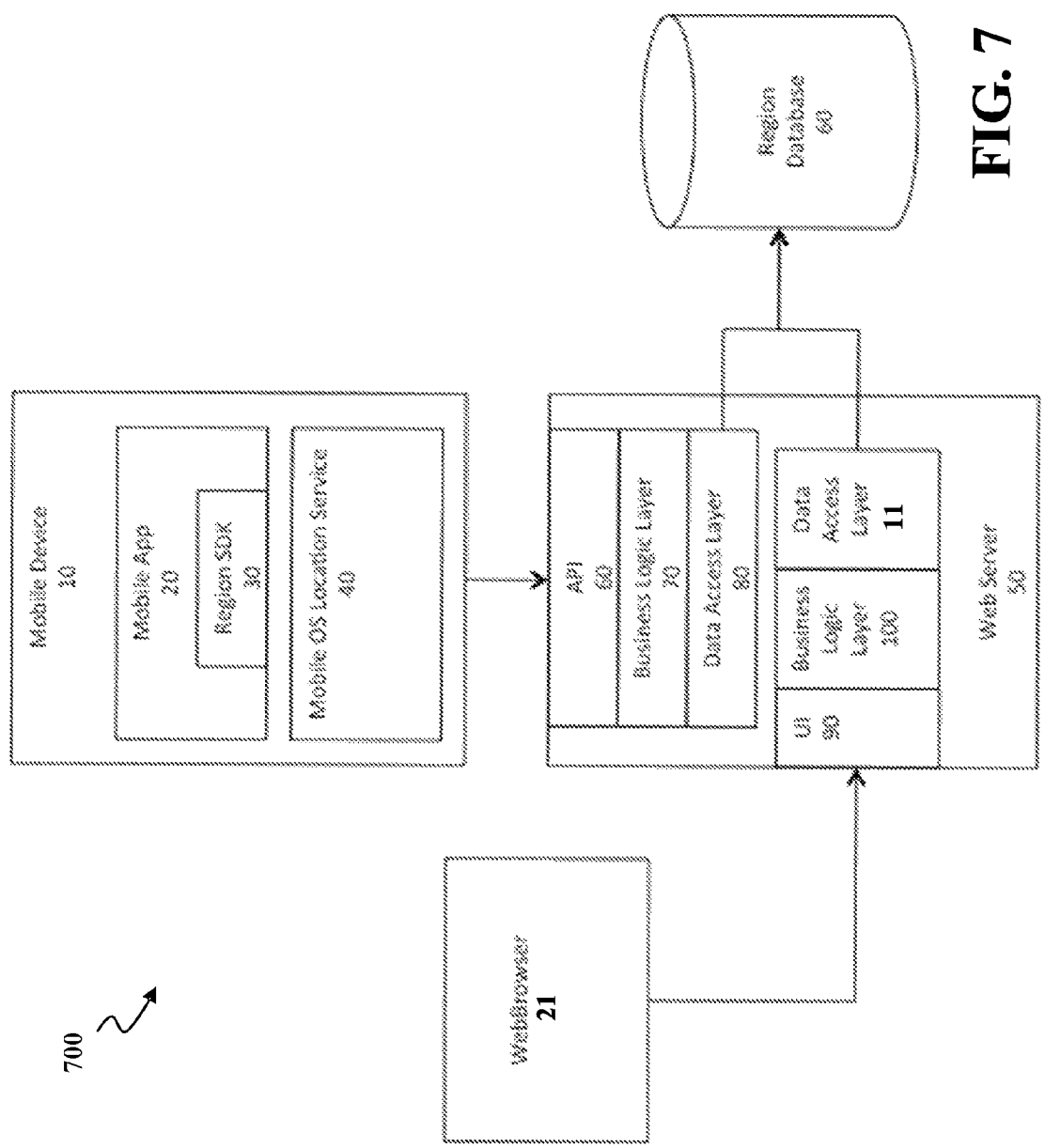
FIG. 7 illustrates a diagram of example system components in accordance with aspects of the present disclosure.

FIG. 7 is a diagram illustrating an example system 700 for performing hybrid location monitoring at a mobile device, as described herein. The system includes a mobile device 10. Examples of mobile devices 10 include a cellular phone, a smart phone, a laptop, a personal digital assistant (PDA), a fitness band, a tablet, a multimedia device, a GPS system, a camera, an MP3 player, a mobile game console, or any other similar functioning mobile device that includes a location service capable of monitoring regions and discovering the location of the device.

Mobile device 10 includes a mobile application 20 downloaded on the mobile device, the application 20 having an SDK or client-side Application Program Interface (API) code embedded therein in order to enable the adaptive region monitoring aspects described herein. The application may be a mobile device application that relies on the mobile device location service to monitor the identified regions of interest in relation to the location of the mobile device. The location service may be a component of the OS of the mobile device. The location service may monitor the location of the mobile device using, e.g., any of GPS, Wi-Fi, and cellular tower triangulation.

Mobile device 10 includes a location service 40 that determines a location of the device and is capable of monitoring regions. The location may be determined using any of GPS, cellular tower triangulation, and Wi-Fi network location mapping. On a smart phone, for example, the location service 40 may be a component within the mobile OS. The location service 40 may report the determined location to other applications functioning on the mobile device 10, such as application 20. Such applications may include a location tracking application, or an application having a region of interest for which the application monitors the mobile device's presence relative to the region. For example, an OS may report a location of the device in latitude and longitude to the application 20 along with an estimated accuracy for the determined location. Additionally, the location service 40 may provide an indication about which source was used to determine the location. For example, the location may be provided with an indication that GPS information was used to obtain the location of the device.

The mobile device mobile device communication with a remote web server 50 in order to receive information about the regions that should be monitored, e.g., as at 602, 604, 612 and with location updates for location tracking, e.g., as at 632, 638, 640, 642. Such communication may be generated at times by the application 20 or Software Development Kit (SDK) 30. In one example, an SDK may be used at the mobile device, e.g., embedded within one or more mobile applications, that enables applications on the mobile device to embed the technology to enable the mobile device to efficiently monitor regions. The SDK does this by being incorporated during development and compilation into the mobile application.

The web server may be a remote server that provides information for periodically adjusting the regions monitored by the mobile device, for assisting in location tracking, and for providing messages, assets or other services corresponding to events relating to the monitored regions. The web server may customize the selection of regions, messages, and assets by matching user tags to region tags, message tags, and/or assets tags for nearby regions.

The web server includes, e.g., an Application Program Interface (API) 60, business logic layer 70, data access layer 80 configured to receive and process the communication from the mobile device and process. Web server also includes business logic layer 100 and data access layer 11 that provide the capability to retrieve regions and messages for the mobile applications, e.g., by matching user tags and any of region tags, message tags, and asset tags for nearby regions.

The web server includes a user interface (UI) that can be accessed, e.g., via a web browser 21. The user interface allows information to be entered into the web browser, such as the entry and management of regions, associated messages and assets as well as tags for the region, messages, and/or assets. Web server may also include or be operatively coupled to a region database 60 that stores the identified regions. The regions may be identified, e.g., by a region ID. Each region may be stored in connection with their physical location, e.g., in latitude and longitude. Messages may be stored in connection with each region, the messages identified as corresponding to Enter events, Exit events, or other events, and each message may have its own message tag(s).

Figure 8:
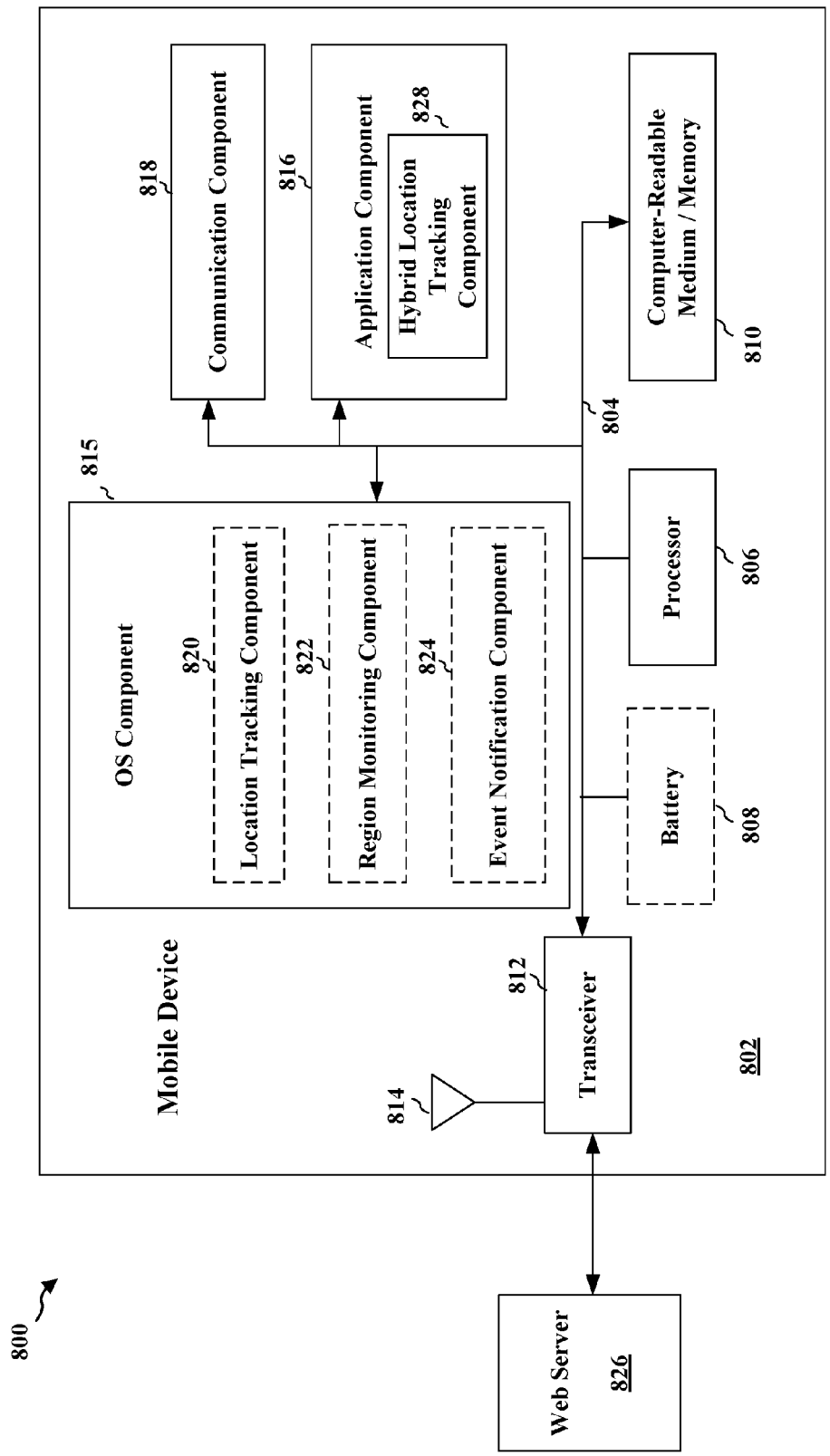
FIG. 8 is a diagram illustrating an example hardware implementation of a mobile device, in accordance with aspects presented herein.

FIG. 8 is a diagram 800 illustrating example aspects of a hardware implementation of a mobile device 802 employing a processing system.

Such a processing system may comprise various circuits including one or more processors and/or components, represented by the processor 806, the components 815, 816, 818, 820, 822, 824, and 826, computer-readable medium/memory 810, and battery 808, linked to each other by a bus 804. The bus 802 may link various other circuits which are not described in detail.

The mobile apparatus may comprise a transceiver 812 coupled to the processing system. The transceiver 812 may be coupled to one or more antennas 814 in order to provide a means for communicating with various other apparatus over a transmission medium. For example, the transceiver may be used to transmit the registration, e.g., including user tags, requests for regions to monitor, and location updates including notification of events such as entering/exiting a monitored region, in connection with application 816 to a remote web server 826. Such communication may be performed wirelessly, such as using a cellular network and Wi-Fi, among others. The transceiver 812 may be configured to both receive and process signals, e.g., including signals from a web server such as 826, and to provide information from the signal to the processing system, e.g., to communication module. For example, the transceiver may receive communication from the web server 826, such as regions to monitor, and adjusted radius for a personal region, messages, and assets. Communication module 818 may then provide the information to the application component or to another application component.

Processor 806 may be configured for general processing, including the execution of software stored on the computer-readable medium/memory 810. Such software, when executed by the processor 806, may cause the processing system to perform the various functions described supra. The processing system further includes at least one of the components 815, 816, 818, 820, 822, 824, and 828. For example, the OS 815 of the mobile device may comprise, e.g., a location service component 820 to determine the location of the mobile device, e.g., using any of GPS, Wi-Fi network location mapping component 824, cellular triangulation, in order to determine location updates that can be communicated to application component 816, as described supra. Additionally, OS 815 may include a region monitoring component 822 that performs region monitoring of regions, as instructed by the application(s) downloaded on the mobile device. The OS may further include an event notification component 824 that notifies the application when region Enter events, region Exit events, and personal region Exit events occur. Mobile application component 816 may further include a hybrid location tracking component that determines whether or not to enable or disable location updates from the mobile OS component 815 based on entrance/exit from a region, as described, e.g., in connection with FIG. 6.

The mobile device 800 may comprising, e.g., means for receiving notification of entering a first region from a mobile Operating System (OS); means for requesting region information for the first region from a web server; means for determining whether to enable location updates based on the region information for the first region; and means for enabling location updates from the mobile OS when it is determined to enable location updates. Such means may comprise software components running in the processor 806, resident/stored in the computer readable medium/memory 810, one or more hardware components coupled to the processor 806, or some combination thereof. In one example, mobile device may be a smart phone or other smart device.

Aspects may further include a web service apparatus for enabling hybrid location monitoring at a web server, comprising means for receiving entry of a plurality of regions along with region information for each of the regions, wherein region information includes an indication of whether location tracking should be enabled within that region; means for receiving an indication from a mobile device that the mobile device has entered a first region; and means for transmitting region information for the first region to the mobile device, including the indication of whether location tracking should be enabled within that region. Similar to that described for the mobile device, such means may comprise software components running in a processor at a web server, resident/stored in the computer readable medium/memory at a web server, one or more hardware components coupled to the processor at a web server, or some combination thereof.

Figure 9:
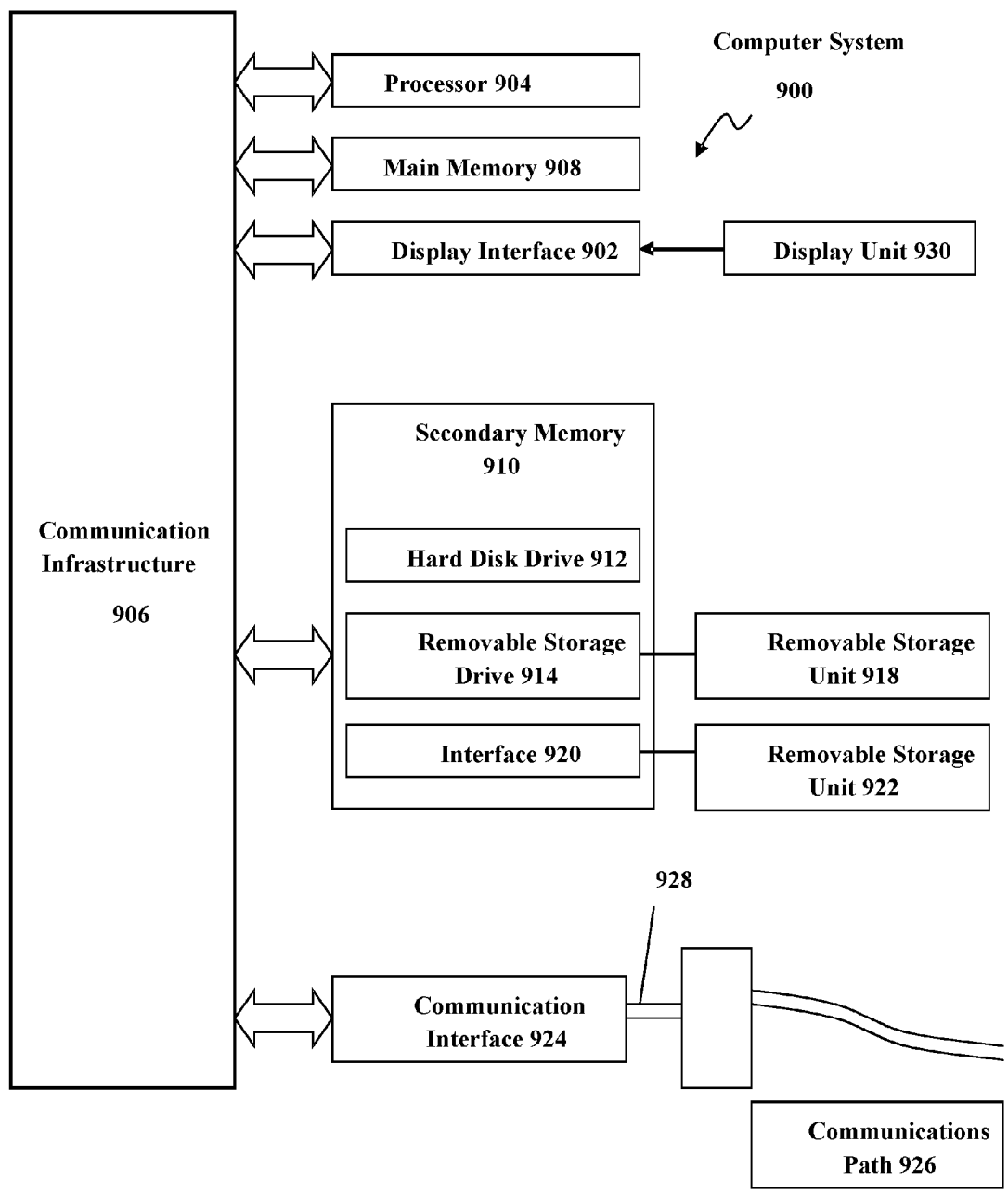
FIG. 9 illustrates a block diagram of various example system components, in accordance with aspects of the present disclosure.

FIG. 9 presents an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein. An example of such a computer system 900 is shown in FIG. 9.

Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 912, and signals 928. These computer program products provide software to the computer system 900. Aspects presented herein may include such computer program products.

Computer programs (also referred to as computer control logic) are stored in main memory 908 and/or secondary memory 910. Computer programs may also be received via communications interface 924. Such computer programs, when executed, enable the computer system 900 to perform the features presented herein, as discussed herein. In particular, the computer programs, when executed, enable the processor 910 to perform the features presented herein. Accordingly, such computer programs represent controllers of the computer system 900.

In aspects implemented using software, the software may be stored in a computer program product and loaded into computer system 900 using removable storage drive 914, hard drive 912, or communications interface 920. The control logic (software), when executed by the processor 904, causes the processor 904 to perform the functions as described herein.

In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

Figure 10:
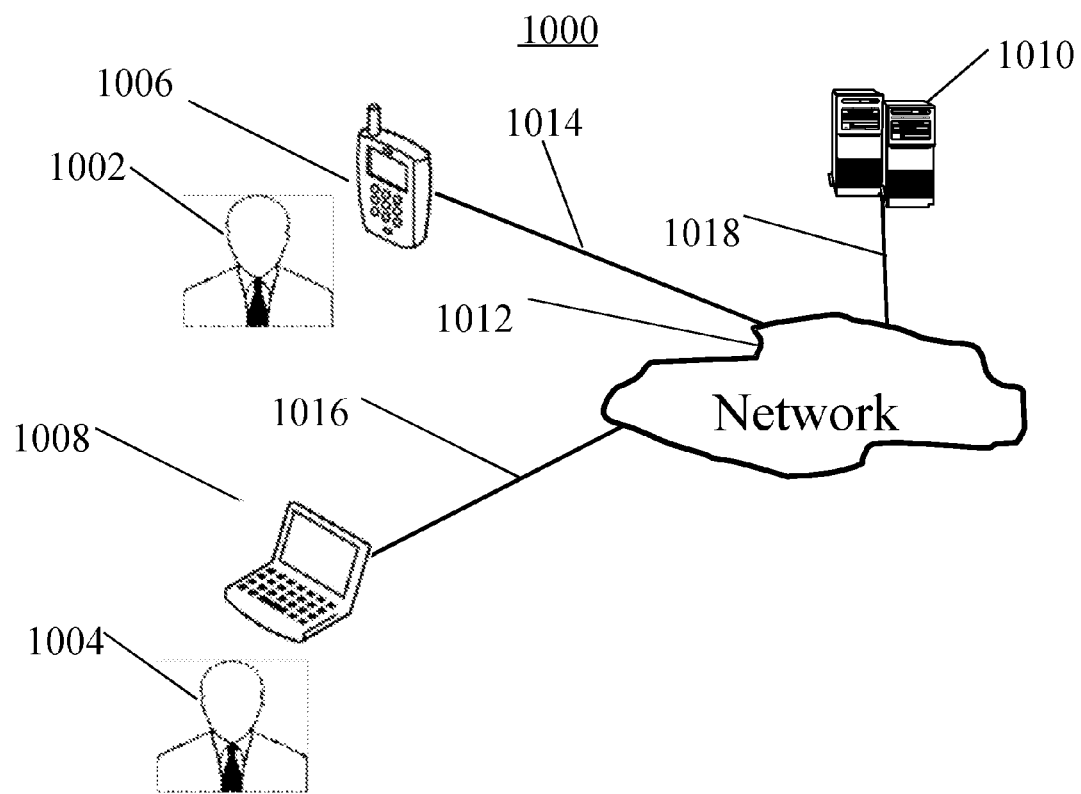
FIG. 10 is a block diagram of various example system components, in accordance with aspects of the present disclosure.

FIG. 10 is a block diagram of various example system components, in an example communication system 1000 usable in accordance with aspects presented herein. The communication system 1000 includes one or more accessors 1002 and 1004 (also referred to interchangeably herein as one or more "users") and one or more terminals 1006, 1008. In one aspect, data for use in accordance aspects presented herein, for example, may be input and/or accessed by accessors 1002, 1004 via terminals 1006, 1008, such as telephonic devices, smart devices, wireless devices, such as personal digital assistants ("PDAs") or a hand-held wireless devices coupled to a server 1010, such as a PC, minicomputer, mainframe computer, microcomputer, or other device having a processor and a repository for data and/or connection to a repository for data, via, for example, a network 1012, such as the Internet or an intranet, and couplings 1014, 1016, and 1018. The couplings 1014, 1016, and 1018 may include, for example, wired, wireless, or fiber optic links. For example, a wireless coupling may comprise a cellular communication link (3G, 4G, LTE or future cellular protocol) or Wi-Fi connection.

Example aspects of the present invention have now been described in accordance with the above advantages. It will be appreciated that these examples are merely illustrative of aspects of the present invention. Many variations and modifications will be apparent to those skilled in the art.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of performing hybrid mobile device location monitoring at a mobile device, comprising:
   receiving, at an application operating on the mobile device, notification of entering a first region from a mobile Operating System (OS) of the mobile device based on region monitoring performed by the mobile device for at least the first region;
   requesting region information for the first region from a web server in response to receiving the notification of entering the first region from the OS based on the region monitoring;
   receiving the region information from the web server, the region information including an indication regarding whether to enable or disable location updates within the first region;
   determining, at the mobile device, whether to enable location updates or to disable location updates while within the first region based on the region information for the first region; and
   enabling, at the mobile device, location updates from the mobile OS when it is determined to enable location updates.

2. The method of claim 1, further comprising:
   receiving a location update from the mobile OS when location updates are enabled; and
   transmitting the location update to the web server.

3. The method of claim 2, further comprising:
receiving an entrance notification for a second region from the web server; and
requesting region information for the second region from the web server.

4. The method of claim 1, further comprising processing region messages based on the region information received from the web server.

5. The method of claim 1, further comprising:
performing region monitoring, at the mobile device, for the first region prior to requesting the region information for the first region, and
wherein the region information is requested when it is determined at the mobile device that the mobile device has entered the region.

6. The method of claim 5, further comprising:
continuing to perform region monitoring without performing location updates when it is determined to disable enable location updates based on the region information for the first region.

7. The method of claim 6, wherein performing region monitoring includes periodically requesting an update from the web server regarding the regions for which the mobile device should perform region monitoring.

8. The method of claim 1, further comprising:
receiving notification of exiting the first region from the mobile OS;
determining whether to location updates were enabled based on entrance into the first region; and
disabling location updates from the mobile OS when it is determined that location updates were enabled based on entrance into the first region.

9. The method of claim 1, wherein the location update is transmitted from the mobile device to the web server using an anonymous token to identify the mobile device.

10. A mobile device apparatus for performing hybrid mobile device location monitoring at a mobile device, comprising:
means for receiving notification of entering a first region from a mobile Operating System (OS) of the mobile device based on region monitoring performed by the mobile device for at least the first region;
means for requesting region information for the first region from a web server in response to receiving the notification of entering the first region from the OS based on the region monitoring;
means for receiving the region information from the web server, the region information including an indication regarding whether to enable or disable location updates within the first region;
means for determining whether to enable location updates or to disable location updates while within the first region based on the region information for the first region; and
means for enabling location updates from the mobile OS when it is determined to enable location updates.

11. A mobile device, comprising:
a memory; and
at least one processor coupled to the memory and configured to:
receive notification of entering a first region from a mobile Operating System (OS) of the mobile device based on region monitoring performed by the mobile device for at least the first region;
request region information for the first region from a web server in response to receiving the notification of entering the first region from the OS based on the region monitoring;
receive the region information from the web server, the region information including an indication regarding whether to enable or disable location updates within the first region;
determine whether to enable location updates or to disable location updates while within the first region based on the region information for the first region; and
enable location updates from the mobile OS when it is determined to enable location updates.

12. A non-transitory computer program product for performing region monitoring at a mobile device, comprising:
a computer-readable medium comprising code for:
receiving notification of entering a first region from a mobile Operating System (OS) of the mobile device based on region monitoring performed by the mobile device for at least the first region;
requesting region information for the first region from a web server in response to receiving the notification of entering the first region from the OS based on the region monitoring;
receiving the region information from the web server, the region information including an indication regarding whether to enable or disable location updates within the first region;
determining whether to enable location updates or to disable location updates while within the first region based on the region information for the first region; and
enabling location updates from the mobile OS when it is determined to enable location updates.

13. A method of enabling hybrid location monitoring at a web server, comprising:
receiving entry of a plurality of regions along with region information for each of the regions, wherein region information includes an indication of whether location tracking should be enabled within that region;
receiving an indication from a mobile device that the mobile device has entered a first region;
transmitting region information for the first region to the mobile device, including the indication of whether location tracking should be enabled within that region, wherein the indication is based on the presence of a defined region comprised within the first region;
receiving a location update from the mobile device based on location tracking by the mobile device, wherein the location update indicates entry of the mobile device into the defined region comprised within the first region; and
transmitting a notification to the mobile device triggered by the entry of the mobile device into the defined region within the first region.

14. A web service apparatus for enabling hybrid location monitoring at a web server, comprising:
means for receiving entry of a plurality of regions along with region information for each of the regions, wherein region information includes an indication of whether location tracking should be enabled within that region;
means for receiving an indication from a mobile device that the mobile device has entered a first region;
means for transmitting region information for the first region to the mobile device, including the indication of whether location tracking should be enabled within that region, wherein the indication is based on the presence of a defined region comprised within the first region;

means for receiving a location update from the mobile device based on location tracking by the mobile device, wherein the location update indicates entry of the mobile device into the defined region comprised within the first region; and means for transmitting a notification to the mobile device triggered by the entry of the mobile device into the defined region within the first region.

15. A web service apparatus, comprising:

a memory; and at least one processor coupled to the memory and configured to:
receive entry of a plurality of regions along with region information for each of the regions, wherein region information includes an indication of whether location tracking should be enabled within that region;
receive an indication from a mobile device that the mobile device has entered a first region;
transmit region information for the first region to the mobile device, including the indication of whether location tracking should be enabled within that region, wherein the indication is based on the presence of a defined region comprised within the first region;
receive a location update from the mobile device based on location tracking by the mobile device, wherein the location update indicates entry of the mobile device into the defined region comprised within the first region; and
transmit a notification to the mobile device triggered by the entry of the mobile device into the defined region within the first region.

16. A non-transitory computer program product for enabling hybrid location monitoring via a web server, comprising:

a computer-readable medium comprising code for:
receiving entry of a plurality of regions along with region information for each of the regions, wherein region information includes an indication of whether location tracking should be enabled within that region; and
receiving an indication from a mobile device that the mobile device has entered a first region;
transmitting region information for the first region to the mobile device, including the indication of whether location tracking should be enabled within that region, wherein the indication is based on the presence of a defined region comprised within the first region;
receiving a location update from the mobile device based on location tracking by the mobile device, wherein the location update indicates entry of the mobile device into the defined region comprised within the first region; and
transmitting a notification to the mobile device triggered by the entry of the mobile device into the defined region within the first region.

17. The method of claim 13, wherein the notification comprises at least one of a message, an asset, and an indication for the mobile device to perform processing related to the entry into the defined region.

18. The method of claim 17, wherein the processing related to the entry into the defined region comprises updating statistics associated with the defined region.

19. The web service apparatus of claim 15, wherein the notification comprises at least one of a message, an asset, and an indication for the mobile device to perform processing related to the entry into the defined region.

20. The web service apparatus of claim 19, wherein the processing related to the entry into the defined region comprises updating statistics associated with the defined region.

21. The mobile device of claim 11, wherein the at least one processor is further configured to:
receive a location update from the mobile OS when location updates are enabled; and
transmit the location update to the web server.

22. The method of claim 21, wherein the at least one processor is further configured to:
receive an entrance notification for a second region from the web server; and
request region information for the second region from the web server.

23. The mobile device of claim 11, wherein the at least one processor is further configured to:
process region messages based on the region information received from the web server.

24. The mobile device of claim 11, wherein the at least one processor is further configured to:
perform region monitoring, at the mobile device, for the first region prior to requesting the region information for the first region, and
wherein the region information is requested when it is determined at the mobile device that the mobile device has entered the region.

25. The mobile device of claim 24, wherein the at least one processor is further configured to:
continue to perform region monitoring without performing location updates when it is determined to disable enable location updates based on the region information for the first region.

26. The mobile device of claim 25, wherein performing region monitoring includes periodically requesting an update from the web server regarding the regions for which the mobile device should perform region monitoring.

27. The mobile device of claim 11, wherein the at least one processor is further configured to:
receive notification of exiting the first region from the mobile OS;
determine whether to location updates were enabled based on entrance into the first region; and
disable location updates from the mobile OS when it is determined that location updates were enabled based on entrance into the first region.

28. The mobile device of claim 11, wherein the location update is transmitted from the mobile device to the web server using an anonymous token to identify the mobile device.

* * * * *